(12) United States Patent
Savage

(10) Patent No.: US 6,179,540 B1
(45) Date of Patent: Jan. 30, 2001

(54) TRAILER APPARATUS FOR LIFTING AND TRANSPORTING ROUND HAY BALES

(75) Inventor: Basil W. Savage, Madill, OK (US)

(73) Assignee: Savage Equipment Incorporated, Madill, OK (US)

(*) Notice: Under 35 U.S.C. 154(b), the term of this patent shall be extended for 0 days.

(21) Appl. No.: 09/548,332

(22) Filed: Apr. 12, 2000

(51) Int. Cl.[7] .................................................. B60P 3/00
(52) U.S. Cl. .......................................... 414/24.5; 414/459
(58) Field of Search .............................. 414/24.5, 24.6, 414/111, 459, 911

(56) References Cited

U.S. PATENT DOCUMENTS

| | | | | |
|---|---|---|---|---|
| 4,072,241 | * | 2/1978 | Parker et al. | 414/459 X |
| 4,204,790 | * | 5/1980 | Baxter | 414/24.5 |
| 4,227,844 | * | 10/1980 | Love | 414/459 X |
| 4,396,331 | * | 8/1983 | Forstar | 414/459 X |

* cited by examiner

Primary Examiner—Janice L. Krizek
(74) Attorney, Agent, or Firm—McAfee & Taft

(57) ABSTRACT

A trailer apparatus for lifting and transporting round hay bales. The trailer apparatus has a wheel support frame with lateral support members at each side. A lifting frame depends from each lateral support. A lifting beam extends from the forward end to the rear end of each lifting frame. The lifting frames are movable between an open position so that a round bale can be positioned therebetween, and a closed position. When the lifting frames move from the open to the closed position, the lifting frames move inwardly and upwardly to engage round hay bales and lift them from the ground. The lifting beam has a rotatable or rollable outer surface so that when the lifting beam engages the hay bale to move it upwardly from the ground, the beam will roll to prevent pinching of the hay bale.

14 Claims, 9 Drawing Sheets

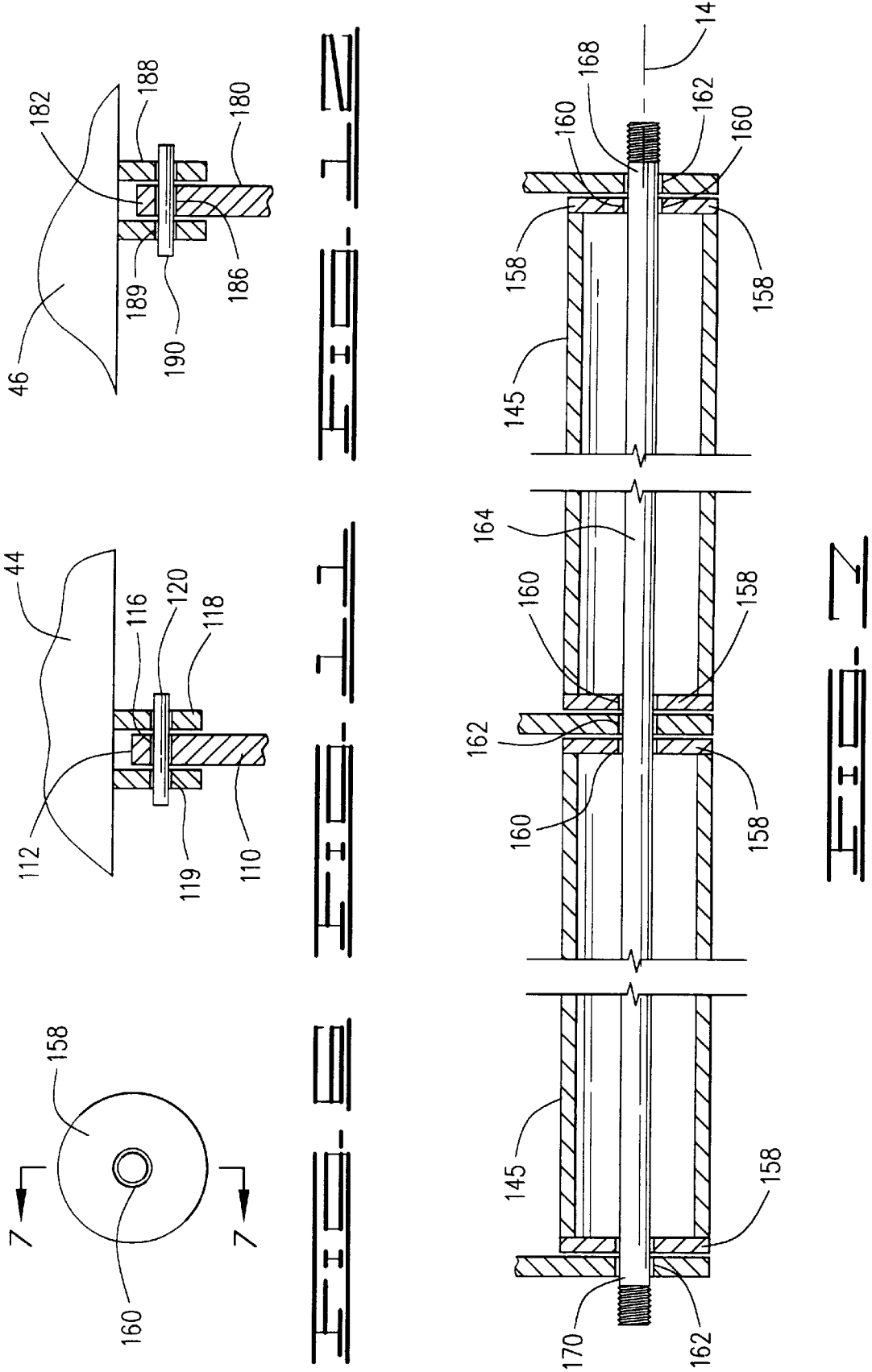

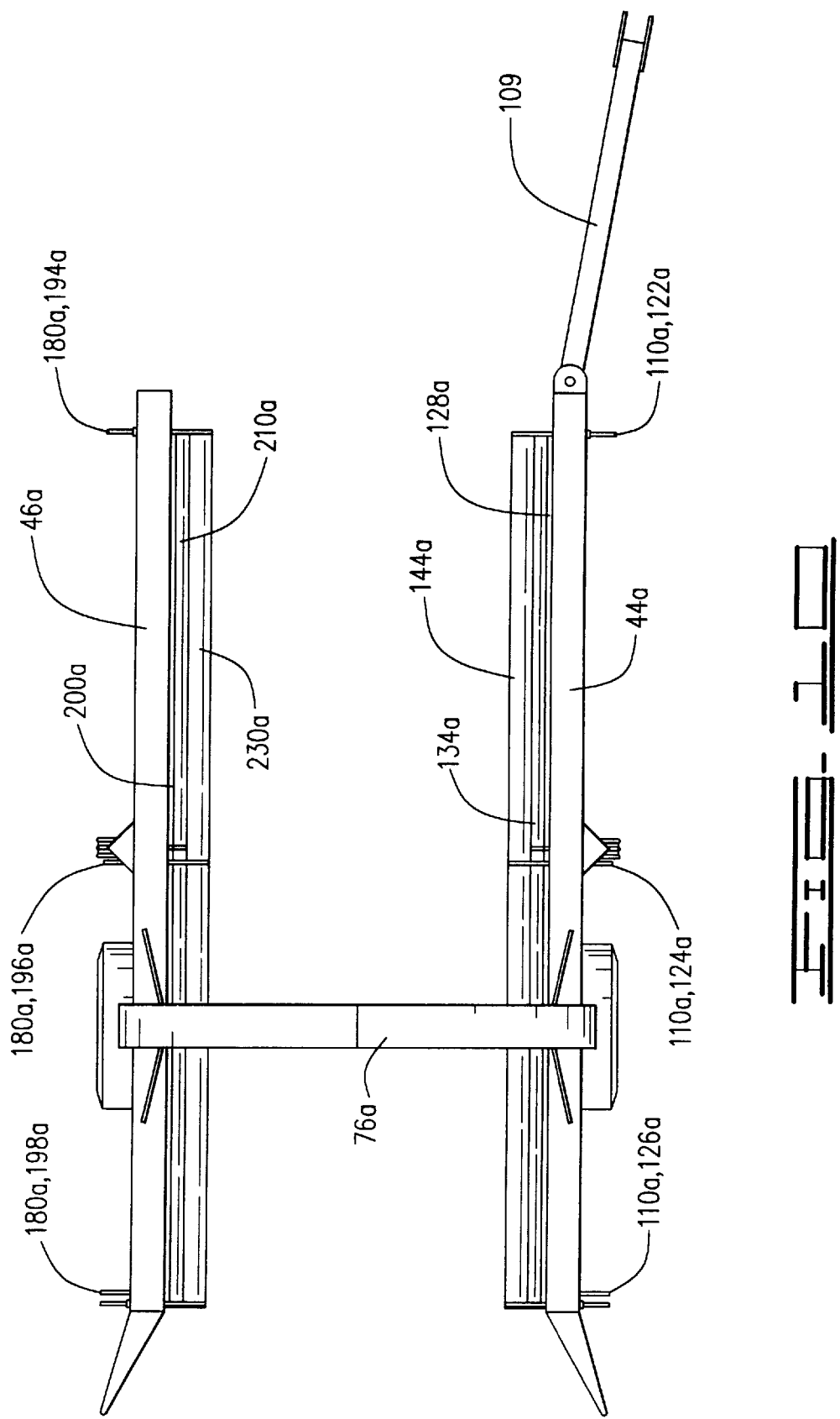

TRAILER APPARATUS FOR LIFTING AND TRANSPORTING ROUND HAY BALES

BACKGROUND OF THE INVENTION

The present invention relates to a trailer for lifting and transporting hay bales, and more particularly to a trailer apparatus for lifting and transporting large, round hay bales.

It is common practice for hay to be collected and baled into large, round hay bales. Such round hay bales are typically very heavy and may be approximately five to six feet in diameter and from five to six feet long. Each hay bale weighs several hundred pounds. Round hay bales are generally collected in the field and are stored at one or more specific locations from which they can then be moved for feeding purposes. There are a number of ways in which the round hay bales are lifted from the ground and transported. The most common way is to use a hay wagon which can carry more than one round hay bale. The bales are typically placed on such hay wagons by utilizing a tractor or other vehicle which has a forklift-type device to spear and lift the round bales of hay and place them on the hay wagon. Although such an arrangement works effectively, it typically takes one person to operate the machine which lifts the hay bales and one person to operate the vehicle towing the hay wagon. If only one person performs both operations, it is time-consuming and inefficient.

There are a number of other apparatus that can be utilized to lift and transport hay bales such as those described in U.S. Pat. No. 4,072,241 to Parker et al. and U.S. Pat. No. 4,204,790 to Baxter et al. The Parker et al. patent discloses an agricultural vehicle for transporting round hay bales which utilizes extensible members 32 which cause bale lifting and supporting member arms 22 to rotate inwardly to engage and lift a round hay bale. Although such an arrangement works well, there is a need for improved lifting and transporting apparatus.

Oftentimes round hay bales are left in the field for a long period of time prior to being lifted and/or transported. The portion of the hay in contact with the ground can become loose. Utilizing an apparatus like that shown in the Parker et al. patent can sometimes cause the hay to be lost since as the lifting arms move inwardly and upwardly, a pinching of the hay bale will occur which may cause the loose hay that has been in contact with the ground surface to fall away from the round bale. Thus, there is a need for a lifting and transporting apparatus that will engage and lift round hay bales that will not squeeze the hay bale in such a way as to cause a portion of the hay bale to be lost or left on the ground. The present invention engages and lifts round hay bales in such a way as to prevent the pinching and/or squeezing of the hay bale and will thus effectively lift round hay bales from the ground and will minimize the amount of hay that is pinched and/or left on the ground.

SUMMARY OF THE INVENTION

The present invention is directed to an improved apparatus for lifting and transporting round hay bales. The apparatus includes a wheeled support frame so that it may be towed by a towing vehicle. The support frame has first and second spaced-apart support members and may include a cross member connected at the ends thereof to the first and second support members. The cross member is preferably an arcuately shaped cross member which extends upwardly and inwardly from the first and second support members to provide clearance between the cross member and the bales to be carried by the apparatus. A plurality of first lifting arms are pivotally connected to and depend from the first support member. A plurality of second lifting arms are pivotally connected to and depend from the second support member. First and second lifting beams are connected to the first and second lifting arms respectively.

The apparatus includes an actuation means which may comprise hydraulic cylinders. The hydraulic cylinders are movable from a non-extended position to an extended position. When the hydraulic cylinders are in the non-extended position, the apparatus is in an open position wherein it may be moved so that a hay bale can be positioned between the first and second support members and the first and second lifting beams. The second ends of the hydraulic cylinders are operatively associated with the lifting arms such that when the cylinders are actuated to move from the non-extended to the extended position, it causes the lifting arms to pivot so that the first and second lifting beams move upwardly and inwardly to engage a hay bale positioned therebetween. The lifting beams will engage and lift the hay bale such that sufficient clearance is provided to allow the trailer apparatus to transport the hay bale.

At least one, and preferably both of the first and second lifting beams have a rollable outer surface such that when the first and second beams are in moving engagement with the hay bale being lifted, the surface of the beams will roll and thus the beams will not pinch the hay bale. In other words, the first and second lifting beams will not squeeze the hay bale and cause hay to be dropped or lost. Thus, the present invention provides many advantages over prior art bale transportation equipment in that it is less time consuming and more efficient, and that it captures the hay bale in such a way as to minimize if not completely eliminate the loss of loose hay. These and other objects and advantages of the present invention will become apparent after studying the detailed description of the invention in view of the accompanying drawings and appended claims.

BRIEF DESCRIPTION OF THE DRAWINGS

FIG. 5 is a top view of the apparatus of the present invention.

FIG. 6 is an end view of a lifting beam of the present invention.

FIG. 7 is a section view from line 7—7 in FIG. 6.

FIG. 9 shows a rear view of the apparatus of the present invention with the lifting beams engaging and lifting a hay bale.

FIG. 10 is a top view of an additional embodiment of the present invention.

FIGS. 11 and 12 are section views taken from lines 11—11 and 12—12 respectively in FIG. 3.

DETAILED DESCRIPTION OF A PREFERRED EMBODIMENT

Figure 1:
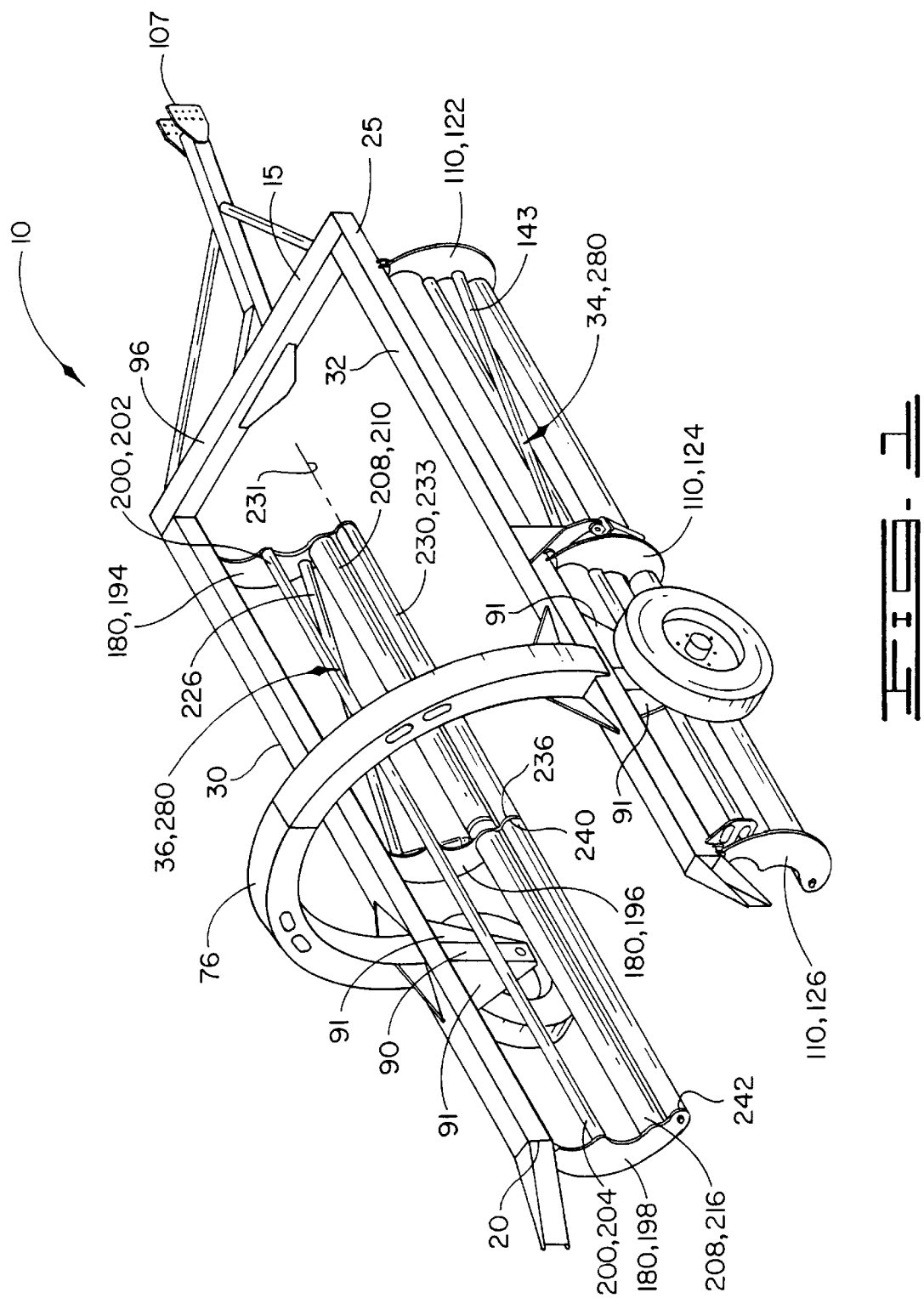
FIG. 1 is a perspective view of the apparatus of the present invention.
Figure 2:
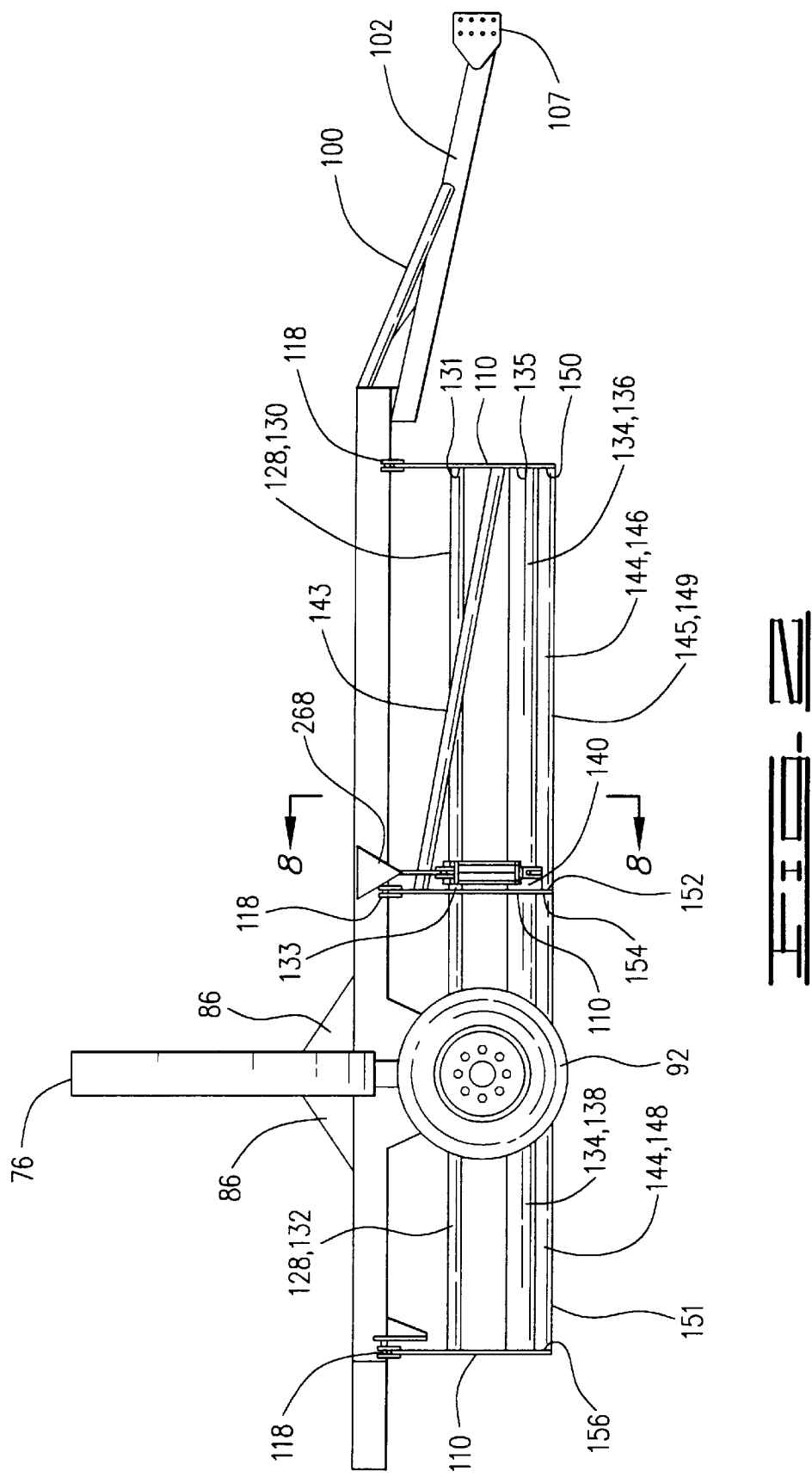
FIG. 2 is a left side elevation view of the present invention.
Figure 3:
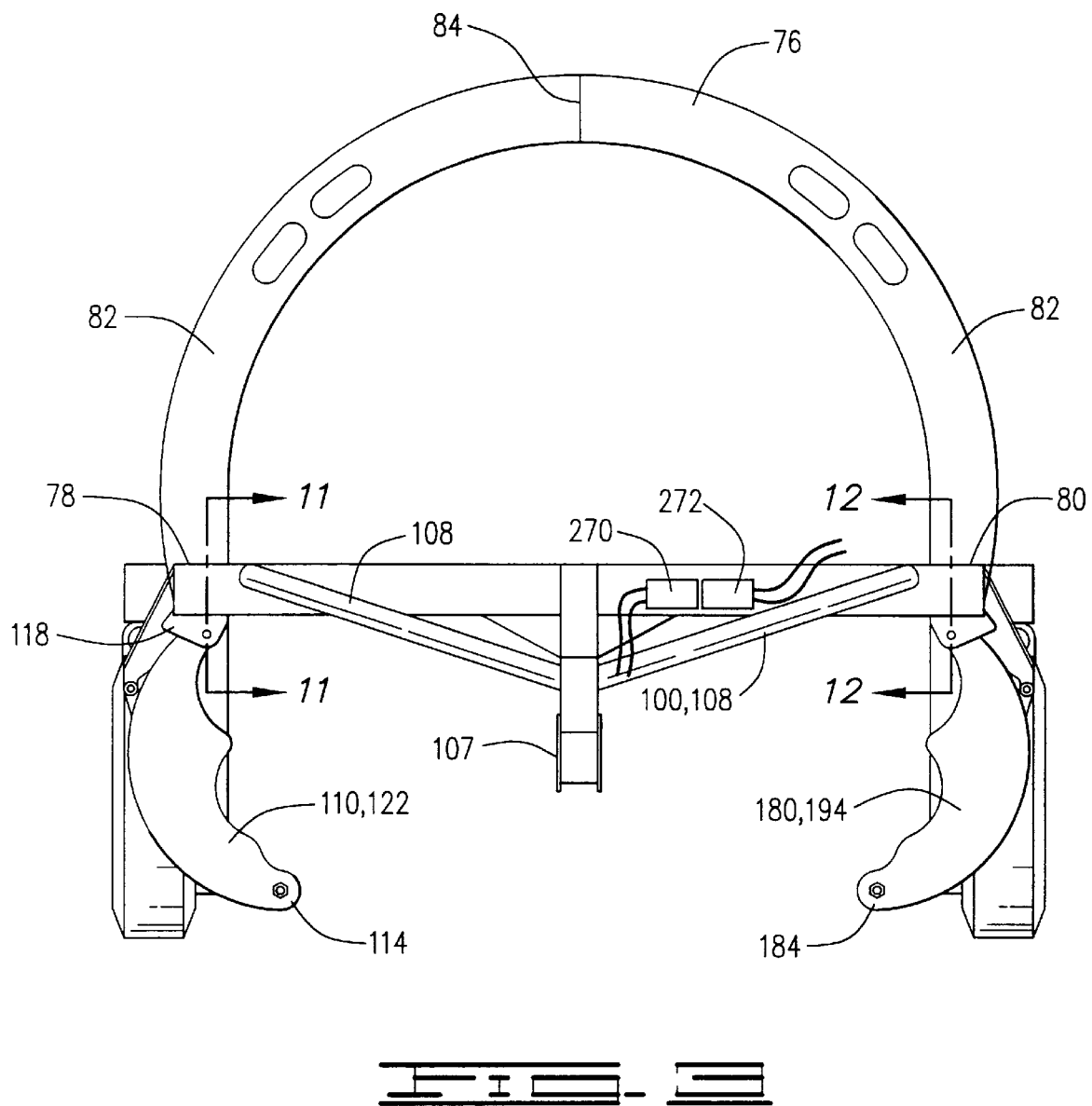
FIG. 3 is a front view of the apparatus of the present invention.
Figure 4:
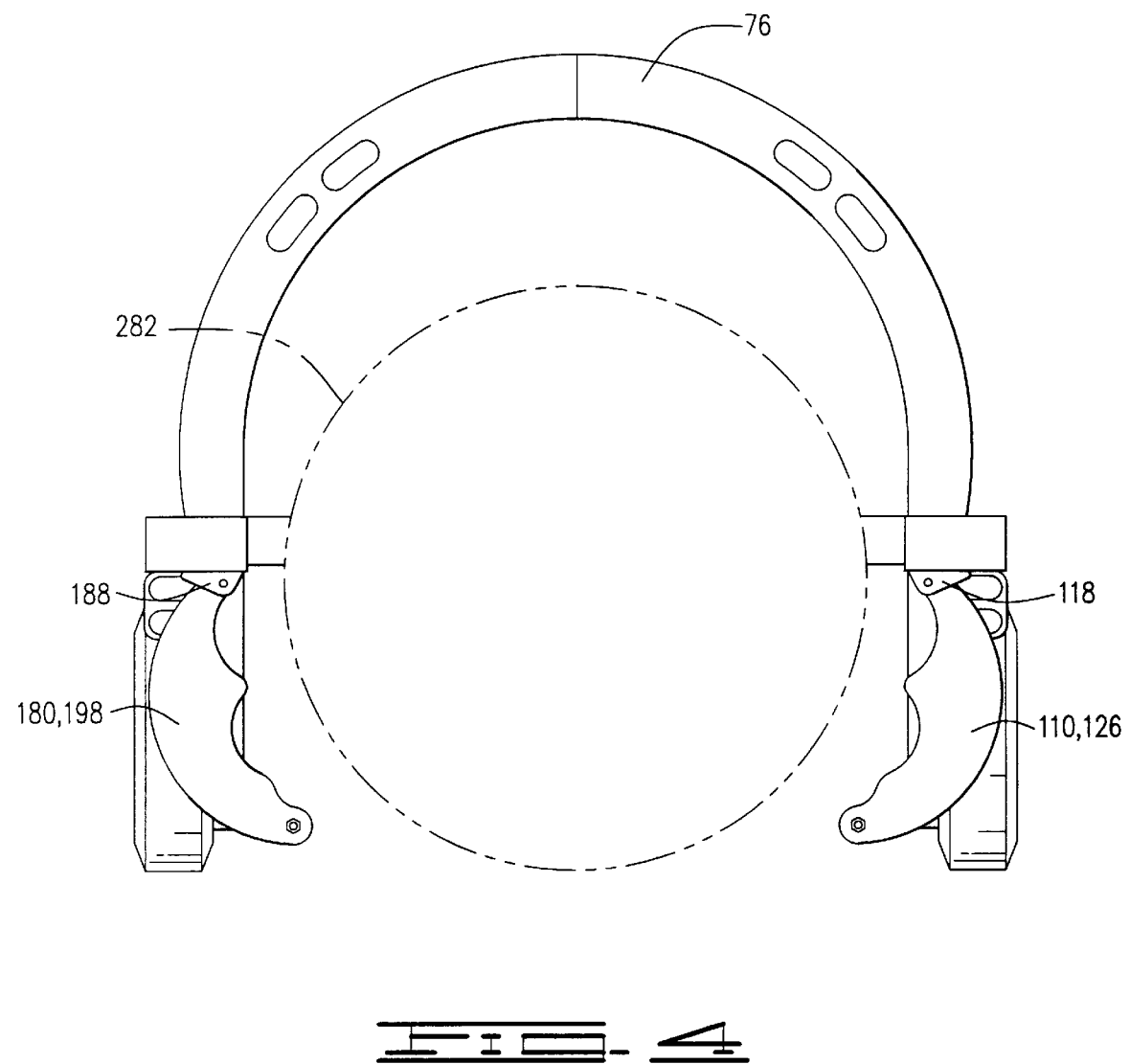
FIG. 4 is a rear view of the apparatus of the present invention, with the outline of a hay bale depicted therein.
Figure 8:
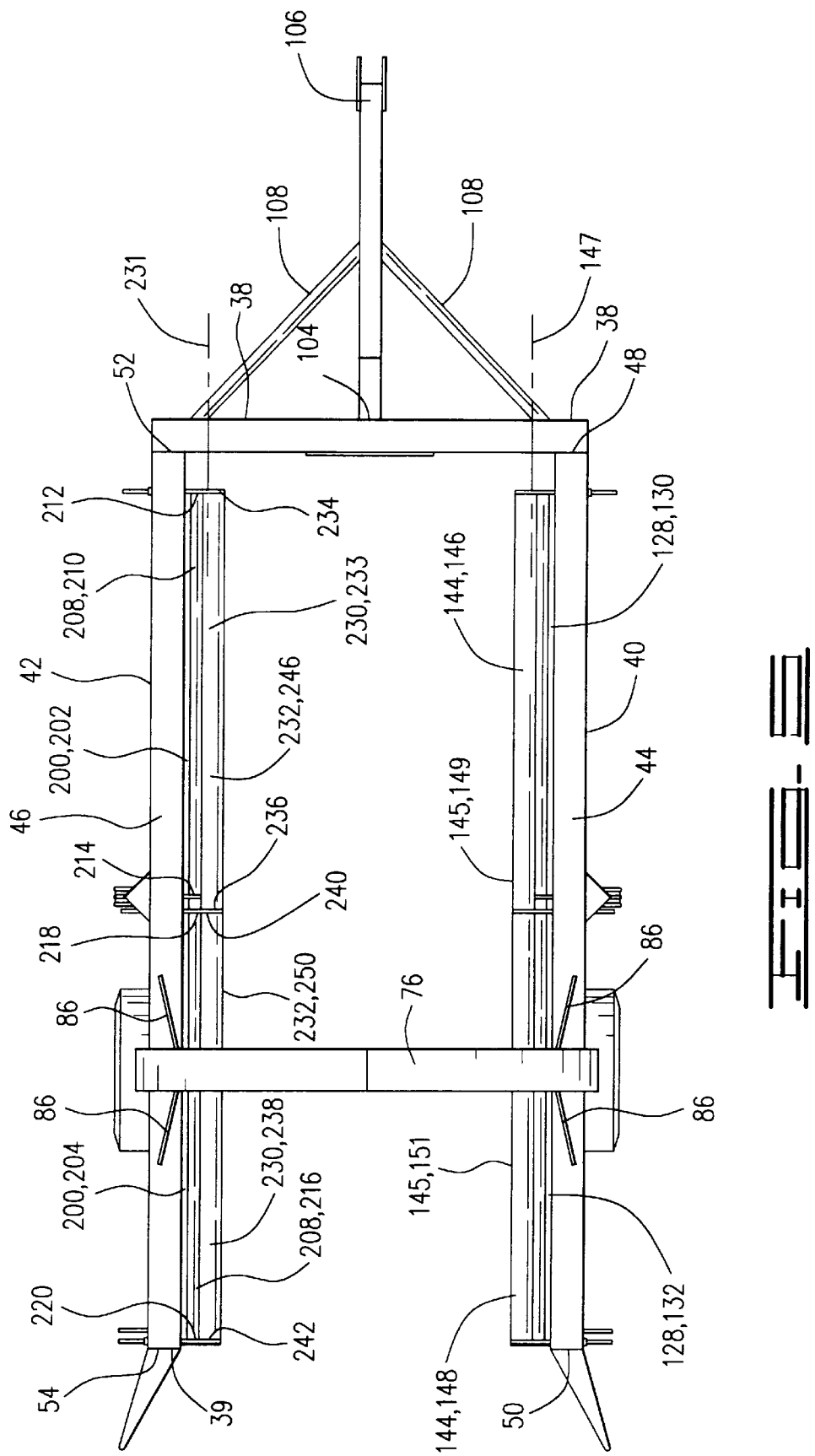
FIG. 8 shows a section view taken from line 8—8 of FIG. 2.
Figure 8:
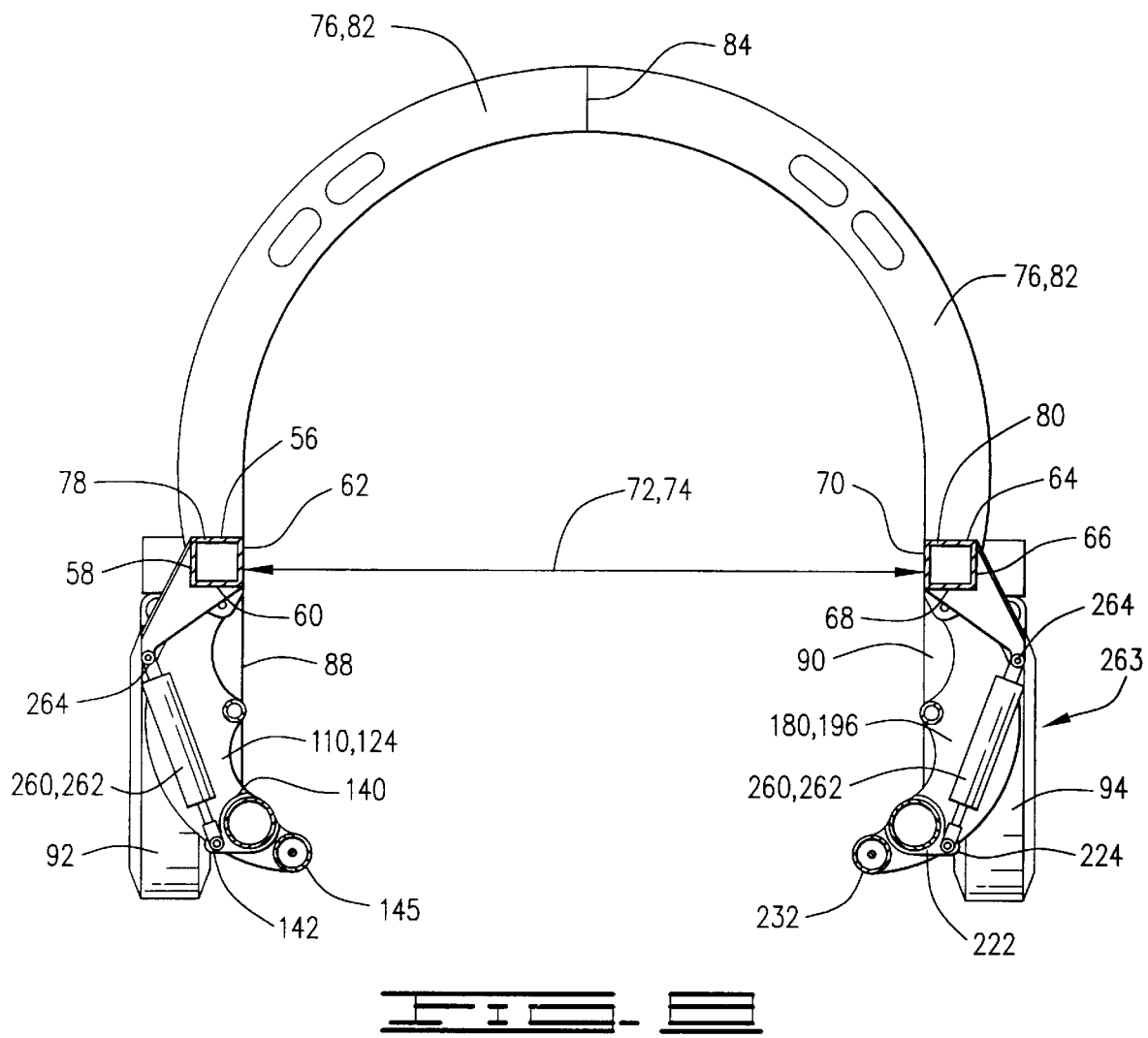
Figure 8:
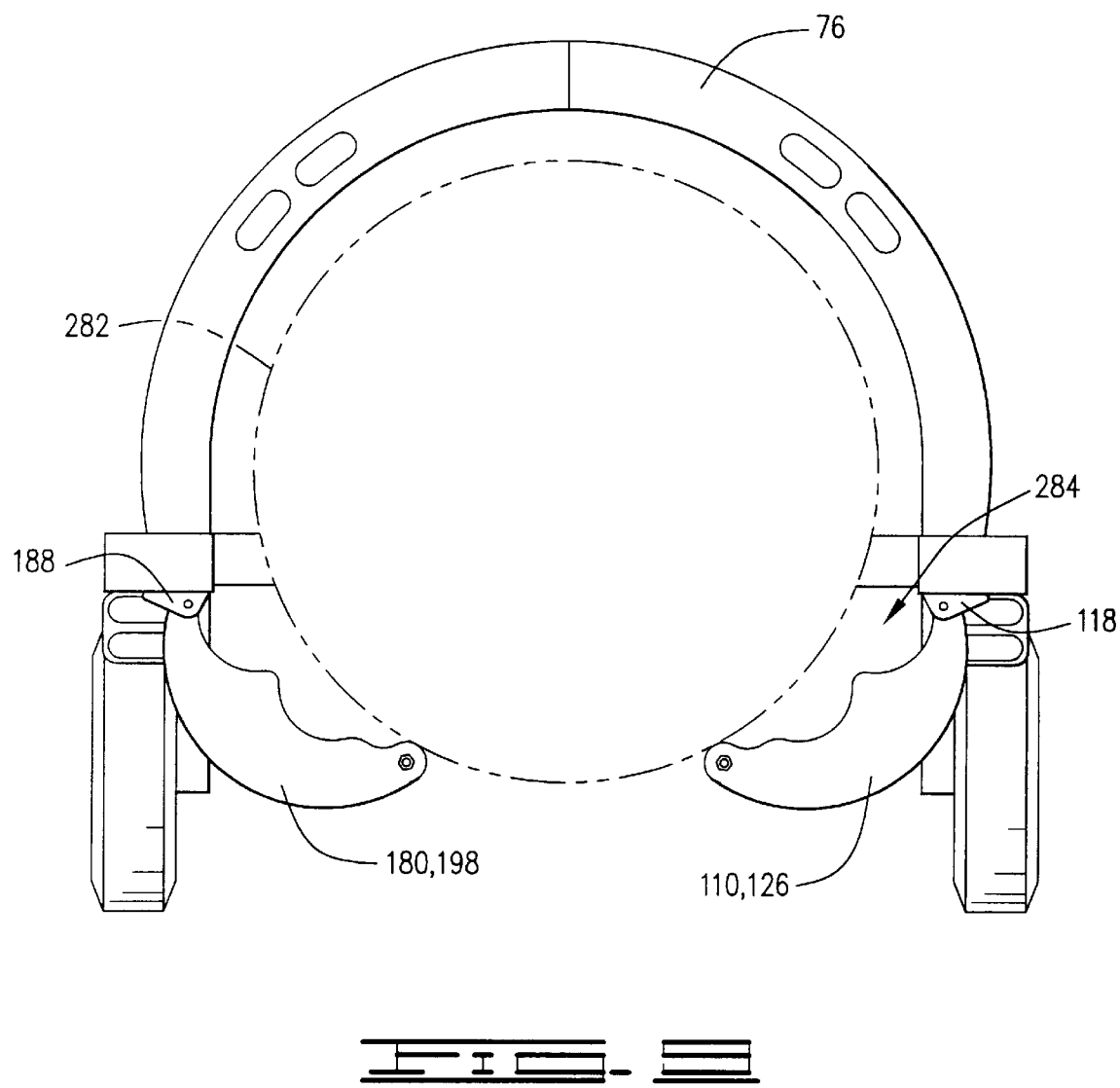

Referring now to the drawings and more specifically to FIG. 1, a trailer apparatus for lifting round hay bales from the ground and for transporting hay bales is shown and generally designated by the numeral 10. Trailer apparatus 10 has a front 15, rear 20, and left and right sides 28 and 30 respectively. Apparatus 10 includes support frame 32 which has first and second lifting frames 34 and 36 depending therefrom. Support frame 32 has a first or front end 38, a rear end 39 and first and second sides 40 and 42, respectively.

Support frame 32 comprises first and second support beams, or members 44 and 46, respectively extending longitudinally between front and rear 15 and 20 of apparatus 10. First and second support beams 44 and 46 may comprise longitudinally extending beams having a generally square or rectangular cross section. First support member 44 has a front end 48 and a rear end 50, and second support member 46 has a front end 52 and a rear end 54. First support member 44 has an upper surface 56, an outer surface 58, a lower surface 60 and an inner surface 62. Likewise, second support member 46 has an upper surface 64, an outer surface 66, a lower surface 68 and an inner surface 70.

First and second support members 44 and 46 have a space 72 therebetween. Space 72 has a distance 74 sufficient to allow a round hay bale to be received therebetween. Support frame 15 may also include a cross member 76. Cross member 76 may have a square, or rectangular cross section and may be an arcuately shaped beam welded or otherwise connected at one end 78 to first support member 44 and at a second end 80 to second support member 46. Cross member 76 which may be referred to as a transverse member 76 will extend over the round hay bales that are to be lifted and carried by apparatus 10. Cross member 76 may comprise two arcuately shaped members 82 welded together or otherwise connected at a joint 84. Support frame 32 may include a plurality of stiffeners 86 welded or otherwise connected to cross member 76 and first and second support members 44 and 46, respectively, to provide strength.

First and second wheel beams 88 and 90 are welded or otherwise connected to and extend vertically downwardly from first and second support members 44 and 46, respectively. Stiffeners 96 may be welded or otherwise affixed to support members 44 and 46 and wheel support members 88 and 90. Apparatus 10 is a mobile apparatus and thus includes rotatably mounted wheels 92 and 94. Wheels 92 and 94 are rotatably mounted to wheel support members 88 and 90, respectively, with suitable axles that extend outwardly from support members 88 and 90. Support frame 32 may also include a forward cross member 96 extending laterally between and welded or otherwise connected to first and second support members 44 and 46 at the front ends 48 and 52 respectively thereof Because the apparatus is mobile, it is adapted to be connected to a towing vehicle, such as a tractor, truck, pickup or other motor vehicle. Apparatus 10 therefore includes a trailer mount 100 connected to and extending forward from lateral cross member 96. Trailer mount 100 includes a center bar or towing bar 102 connected at a rear end 104 thereof to cross member 96 and having a forward end 106. Trailer mount 100 further includes a pair of side stiffeners 108 connected at one end to forward cross member 96 and at a second end to towing bar 102. Forward end 106 is adapted to be connected to a towing vehicle and thus has a fitting 107 which can be connected to a ball receptacle for receiving a ball mounted to a towing vehicle. Forward end 106 may be of any desired configuration adapted to be connected to a ball or any other type of towing connector or apparatus known in the art. Because the apparatus shown in FIGS. 1–9 has a forward cross member, apparatus 10 must be moved and manipulated so that round hay bales are received through the open rear end 20 of apparatus 10 and positioned between support members 44 and 46. If desired, however, the vehicle may have an open front end and an open rear end and the trailer mount may be hingedly connected to either of sides 44 or 46. Such an arrangement is known in the art and is schematically shown in FIG. 10.

The apparatus shown in FIG. 10 is identical to the embodiment shown in FIGS. 1–9, but does not include a forward cross member, and has a hingedly connected tow bar. The apparatus shown in FIG. 10 will be referred to as apparatus 10A, and the features thereof will include the subscript A, which is used for reference purposes. Like numbers will be utilized for features common to both embodiments. Thus, FIG. 10 includes a tow bar 109 hingedly connected at the front end of first support member 44A. If such a configuration is utilized, hay bales may be received either through the open front or rear ends of the apparatus 10A.

Referring now back to FIGS. 1–9, first and second lifting frames 34 and 36 will be described. First lifting frame 34 includes a plurality of first lifting arms 110 at first side 25 depending from first support member 44. First lifting arms 110 have a first end 112 and a second end 114. An opening 116 is defined at first end 112 thereof A plurality of lugs 118 are welded or otherwise mounted to first support frame 44. Lugs 118 define openings 119 which mate with openings 116 such that a pin, bolt or other fastener 120 may be received therethrough. Pin 120 may be retained by any means known in the art. Thus, first lifting arms 110 are pivotally connected to and depend from first support member 44. In the embodiment shown, three first lifting arms 110 are included. For ease of identification, first lifting arms 110 will be referred to as forward first lifting arm 122, middle first lifting arm 124 and rear first lifting arm 126.

First lifting frame 34 further includes an upper stiffener 128 extending longitudinally between lifting arms 122 and 126. Stiffener 128 may comprise a pair of longitudinally extending stiffening members and thus may include member 130 extending between and connected to lifting arms 122 and 124, and member 132 connected to and extending between arms 124 and 126. Forward member 130 has a forward end 131 and a rear end 133. Member 132 has a flat portion to provide clearance for wheel support member 88. Members 130 and 132 may be welded or connected to lifting arms 122, 124, and 126 by any manner known in the art. Lifting frame 34 further includes a lower stiffener 134 extending between rear lifting arm 126 and forward first lifting arm 122. Lower stiffener 134 may comprise a forward stiffening member 136 welded or otherwise connected at the ends thereof to forward lifting arm 122 and middle lifting arm 124. Forward stiffening member 136 has a forward end 135 and a rear end 137. Lower stiffener 134 may further include a rear stiffening member 138 welded or otherwise connected at the ends thereof to middle and rear lifting arms 124 and stiffener 126, respectively. An angled stiffening beam 143 may be welded or otherwise connected at the ends thereof to lifting arms 122 and 124. A mounting boss 140 may be connected to and extend forward from middle lifting arm 124. Rear end 137 of forward stiffening element 136 may be received in and connected to mounting boss 140, which may have a lug 142 extending outwardly therefrom.

First lifting frame 34 also includes a lifting beam 144 extending longitudinally between arms 122 and 126. Lifting beam 144 has a rollable outer surface 145. Longitudinally extending lifting beam 144 has a longitudinal central axis 147 and includes a forward first lifting beam 146 and a rear first lifting beam 148. Lifting beams 146 and 148 are preferably tubular members. Beam 146 has a first end 150 and a second end 152. Beam 148 has a first end 154 and a second end 156. FIG. 6 is typical for ends 150, 152, 154 and 156. Thus, all of such ends comprise a cap 158 having an opening 160 therethrough. An opening 162 is defined through all of lifting arms 110 near the lower end thereof. A tubular rod 164 extends through all of the openings 162 in arms 110 and all of openings 160. Tubular rod 164 may be threaded at the first and second ends 168 and 170 thereof and thus may have nuts or other connectors 172 threaded thereon to hold tubular rods 164 in place. Members 146 and 148 are thus rotatably pinned at the ends thereof and will rotate about longitudinal axis 147. Members 146 and 148 thus have rotatable, or rollable outer surfaces 149 and 151 respectively, which together comprise rollable outer surface 145.

Second lifting frame 36 is essentially a mirror image of first lifting frame 34 and therefore includes a plurality of second lifting arms 180 depending from second side 30. Second lifting arms 180 have a first end or upper end 182 and a second, or lower end 184. An opening 186 is defined at upper end 182 of lifting arms 180. A plurality of lugs 188 are welded or otherwise connected to second support member 46. Lugs 188 have an opening 189 therethrough and thus are adapted to receive the upper end of lifting arms 180 such that a pin 190 can be received through lugs 188 and openings 186 to pivotally connect lifting arms 180 to support member 44. Second lifting arms 180 will be referred to as a forward lifting arm 194, a middle lifting arm 196 and a rear lifting arm 198 for ease of reference.

Second lifting frame 36 further includes an upper stiffening beam 200 which may comprise forward stiffening beam 202 and rear stiffening beam 204. Forward and rear stiffening beams 202 and 204 are welded or otherwise connected at the ends thereof to lifting arms 194, 196 and 198. Rear stiffener 204 has a flat portion to provide clearance for wheel support member 90.

Second lifting frame 36 also includes a lower stiffening beam 208. Stiffening beam 208 includes a forward stiffening member 210 having a first end 212 and a second end 214. Stiffening beam 208 further includes a rear stiffening member 216 having a forward end 218 and a rear end 220. A mounting boss 222 may be connected to and extends forward from middle lifting arm 196. Forward stiffening member 210 is connected to middle lifting arm 196 at mounting boss 222. A lug 224 extends outwardly from mounting boss 222 and will be utilized in connection with the actuation means of the apparatus as will be defined in more detail hereinbelow. Second lifting frame includes an angled stiffening beam 226 connected to and extending between arms 194 and 196.

Second lifting frame 36 includes a second lifting beam 230 extending longitudinally between lifting arms 194 and 198. Second lifting beam 230 has a longitudinal central axis 231 and a rollable outer surface 232 that will roll when the lifting beam is placed into moving engagement with the hay bales as will be described in more detail hereinbelow. Lifting beam 230 may comprise a forward lifting beam 233 having forward end 234 and rear end 236. Lifting beam 230 further includes a rear lifting beam 238 having a forward end 240 and a rear end 242. Forward and rear beams 233 and 238 have common longitudinal central axis 231. Each of ends 234, 236, 240 and 242 have an end identical to that shown in FIG. 7, and thus include a cap 158 having a hole 160 defined therethrough. Each of lifting arms 194, 196 and 198 have an opening therethrough adapted to receive a tubular rod 164, such as opening 162 like that described previously with respect to first lifting arms 180. Tubular rod 164 will extend through holes 160 in beams 233 and 238 and through the openings in arms 194, 196 and 198. Nuts or other connectors may be utilized at the ends of tubular rod 164 to hold rod 164 in place. Thus, beams 233 and 238 are rotatably pinned at the ends thereof and are thus rotatable beams having rotatable or rollable outer surfaces 246 and 250, respectively, which together comprise rotatable, or rollable outer surface 232.

Apparatus 10 further includes an actuation means 260 for moving lifting beams 144 and 230. Actuation means 260 may include hydraulic cylinders 262 connected to first and second support members 44 and 46. Cylinders 262 have upper ends 264 and lower ends 266 and are movable between a non-extended position 263 and an extended position 265. Upper ends 264 may be connected to mounting plates 268 which are connected to and extend outwardly from members 44 and 46 respectively. Lower ends 266 of cylinders 262 are mounted to lugs 142 and 224 respectively. Hydraulic cylinders 262 may be connected to a fluid reservoir 270 which may be mounted to the front of trailer apparatus 10. Reservoir 270 may have a motor 272 associated therewith which can be controlled remotely from within a towing vehicle to control the flow of hydraulic fluid from the reservoir to the cylinders.

Referring now back to FIGS. 1–5 and 7, first and second lifting frames 34 and 36 are shown in an open position 280. In such position, hydraulic cylinders 262 are in non-extended position 263. When it is desired to pick up a round hay bale, trailer apparatus 10 is moved so that a round hay bale 282 may be received through the rear end thereof and is positioned between support members 44 and 46 and first and second lifting beams 144 and 230. Hydraulic cylinders 260 can then be actuated to move to an extended position which will cause first lifting arms 110 and second lifting arms 180 to pivot about pins 120 and 190 respectively. Lifting beams 144 and 230 will move inwardly and upwardly until they engage the side of round hay bale 282. Continued movement will cause hay bale 282 to be lifted from the ground until frames 34 and 36 are in closed, or lifting position 284. Pinching of the hay bale which can cause loss of hay is eliminated, since at least one, and in the present invention preferably both lifting beams have a rotatable or rollable outer surface. Thus, when beams 144 and 230 are in moving engagement with hay bale 282, beams 144 and 230 will rotate causing outer surface 145 and 232 to roll as the hay bale is moved upwardly or downwardly preventing any pinching or squeezing of the hay bale. Thus, even hay that may have become loose will be effectively picked up by the apparatus of the present invention. The apparatus can be towed across a field with a bale 282 therein to another bale location. The bale that has previously been picked up can be lowered to the ground and the apparatus can be moved so that another bale can be received between support members and lifting beams. Hydraulic cylinders 262 can again be actuated so that both hay bales will be lifted and can be transported to any desired spot. The apparatus is thus designed to lift and transport a plurality of hay bales to any desired location. The number of hay bales that can be lifted and carried depends on the design length of the apparatus and is not limited to two, and may be as many as six or more.

The present invention has many advantages over prior art carriers since it is well recognized that hay that sits in a field for a long period of time will tend to become loose and/or somewhat rotten or mildewed where the hay contacts the ground. Often, hay is lost because of the looseness of the bale at that location. However, with the present invention, the rollable outer surface of the lifting beams allows hay to be effectively picked up with minimal loss of loose hay.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A trailer apparatus for lifting round hay bales from a ground surface and for transporting said hay bales, said trailer apparatus being adapted to be towed by a towing vehicle, the trailer apparatus comprising:

first and second longitudinally extending support members, said support members having a space therebetween;

a cross member connected to said first and second support members;

a plurality of first lifting arms pivotally connected to said first support member;

a plurality of second lifting arms pivotally connected to said second support member;

a first lifting beam connected to said first lifting arms;

a second lifting beam connected to said second lifting arms, said first and second lifting beams being movable between an open and a closed, or lifting position; and actuation means for moving said lifting beams between said open and said lifting positions, wherein in said open position said trailer apparatus is positionable so that a round bale may be disposed between said first and second lifting beams, and wherein said lifting beams are movable inwardly and upwardly from said open to said lifting position to engage and lift said round bale from said ground surface so that said round bale is spaced upwardly therefrom, at least one of said first or second lifting beams having a rollable outer surface that will roll about a longitudinal axis thereof when said at least one of said first or second beams is in moving engagement with said round hay bale.

2. The apparatus of claim 1 wherein both of said first and second lifting beams have a rollable outer surface.

3. The apparatus of claim 1 wherein said at least one of said first or second beams is a generally tubular beam rotatable about its longitudinal central axis.

4. The apparatus of claim 3, wherein said at least one of said first or second lifting beams comprises a plurality of tubular beams having a colinear longitudinal central axis, each of said tubular beams being rotatably pinned at the first and second ends thereof.

5. The apparatus of claim 4 wherein both of said first and second beams comprise a plurality of tubular beams rotatably pinned at their first and second ends.

6. The apparatus of claim 1, wherein said actuation means comprises hydraulic cylinders operably associated with said first and second lifting arms, wherein extension and retraction of said cylinders causes said first and second lifting arms to pivot about an end thereof thereby causing said first and second lifting beams to move between said open and said lifting positions.

7. The apparatus of claim 6, said apparatus having first and second ends, said first and second ends being open ends so that said round hay bales may be received therethrough.

8. The apparatus of claim 1, said apparatus having a length such that a plurality of round hay bales can be lifted and transported therewith.

9. An apparatus for lifting round hay bales from a ground surface and for transporting said hay bales, said apparatus comprising:

a support frame having a front end, a rear end, and first and second sides;

a first lifting frame pivotally connected at said first side, said first lifting frame including a first lifting beam;

a second lifting frame pivotally connected at said second side, said second lifting frame including a second lifting beam;

actuation means for moving said first and second lifting frames between an open position, wherein a round hay bale may be received through the front or rear end of said support frame and positioned between said first and second lifting beams, and a closed, or lifting position wherein said first and second lifting beams engage said round hay bale and lift said round bale from said ground surface, at least one of said first and second lifting beams comprising a beam being rotatable about a longitudinal axis thereof.

10. The apparatus of claim 9, wherein said first and second lifting beams are adapted to engage and lift a plurality of round hay bales simultaneously.

11. The apparatus of claim 9, wherein both of said first and second lifting beams are rotatable beams.

12. The apparatus of claim 9, wherein said lifting frames comprise a plurality of lifting arms depending from said first and second sides of said support frame, said lifting beams being connected to a lower end of said lifting arms.

13. The apparatus of claim 12, said beams being rotatable about rods extending from said lifting arms.

14. The apparatus of claim 9, said support frame comprising:

a pair of laterally spaced, longitudinally extending support members; and a cross member connected to said support members.

* * * * *

UNITED STATES PATENT AND TRADEMARK OFFICE
CERTIFICATE OF CORRECTION

PATENT NO.     : 6,179,540 B1
DATED          : January 30, 2001
INVENTOR(S)    : Basil W. Savage Page 1 of 1

It is certified that error appears in the above-identified patent and that said Letters Patent is hereby corrected as shown below:

<u>Title page,</u>
Under U.S. PATENT DOCUMENTS, insert:

-- 4,537,548, 8/1985, Lockhart, 414/24.5
   4,773,806, 9/1988, Beaulieu, 414/24.5 --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*